Patented Sept. 16, 1947

2,427,520

UNITED STATES PATENT OFFICE 2,427,520

PROCESS FOR PRODUCING DRY FOOD PRODUCTS

André E. Briod, Short Hills, and Loran O. Buxton, Newark, N. J., assignors to Nopco Chemical Company, Harrison, N. J., a corporation of New Jersey No Drawing. Application January 15, 1944, Serial No. 518,406

4 Claims. (Cl. 99—6)

This invention relates to dry food products, and more particularly to dry food products fortified with fat-soluble vitamins.

It is rather common practice for feed manufacturers and farmers to incorporate fat-soluble vitamin-containing materials, e. g., cod liver oil, sardine oil, etc., into poultry and animal feeds in order to fortify such feeds with vitamins A and D. However, the vitamins which are contained in such stock feeds are readily susceptible to oxidative deterioration and destruction; consequently, it is necessary in order to provide feeds with the proper vitamin potency to admix the vitamin-containing material therewith only shortly before feeding the stock food. Various proposals have been made for the production of stable vitamin-containing materials of high potency in a dry, granular form which may be admixed with stock and poultry feeds in order to provide vitamin-fortified feeds which are stable over a relatively long period of time. However, as yet, no entirely satisfactory products have been made available.

It has also been a rather common practice for farmers and feed manufacturers to mix molasses with various stock and poultry feeds in order to make these feeds more palatable. However, the products which are obtained have certain disadvantages, particularly when large quantities of molasses are employed. They have a tendency to ferment and otherwies undergo undesirable changes which affect their quality. Furthermore, the products frequently are of a rather sticky nature. In some cases, the disadvantages of such products more than offset the increased palatability and nutritive value thereof.

It is the object of this invention to provide improved dry, highly palatable livestock and poultry feeds.

A further object of this invention is to provide improved highly palatable livestock and poultry feeds in a dry form containing relatively high percentages of molasses.

Another object of the invention is to provide livestock and poultry feeds in a dry form which are fortified with fat-soluble vitamins, said vitamins being stable toward oxidative deterioration.

Other objects of the invention will in part be obvious and in part will appear hereinafter.

We have discovered that highly palatable, dry, free-flowing feeds may readily be prepared from molasses or similar crude sugar syrups and ground, chopped or otherwise comminuted vegetable materials by thoroughly admixing such crude sugar syrup with a comminuted vegetable material, and unslaked lime, i. e., CaO. The resulting product will be a dry, free-flowing material which has no tendency whatsoever to ferment or otherwise become unpalatable. If it is desired to provide such a product which is fortified with fat-soluble vitamins, a material which is highly potent in such vitamins may either be emulsified in the crude sugar syrup or admixed with the comminuted vegetable material prior to admixing the crude sugar syrup and the vegetable material. If desired, both the crude sugar syrup and the vegetable material may be fortified with fat-soluble vitamins prior to admixture thereof. After either the crude sugar syrup or vegetable material or both are fortified with fat-soluble vitamins, the crude sugar syrup, the vegetable material, and CaO are thoroughly admixed. The dry, free-flowing product which is obtained will be highly potent in fat-soluble vitamins. It will contain a mineral which is highly important for proper body nutrition, i. e., calcium; and furthermore, in the majority of cases, preferably in all cases, a substantial part of the vitamin content of the product will be made up of vitamin D which is so essential to the proper assimilation of calcium. Also, as is well known, calcium is quite essential to the body for the proper utilization of the vitamin D. Thus it may readily be seen that the products of our invention are particularly well adapted for the fortification of feeds with vitamin D.

Any type of molasses or crude sugar syrup may be employed in carrying out the process of our invention. Some of the more common types which may be used are blackstrap molasses, invert molasses, beet molasses or the like, the former being highly preferred. Generally, the most suitable grade of molasses is that having a specific gravity between about 43° and 45° Bé.; however, molasses or crude sugar syrups not falling within this range may be used. In the following description, molasses alone is referred to for convenience, but it is to be understood that the description applies equally to other crude sugar syrups and similar materials.

Various finely divided vegetable materials may be employed in preparing the products of the invention. Among others, there may be mentioned wheat germ pressed cake flour, corn oil meal, dried distiller's grain solubles (dried distiller's corn and/or rye solubles), linseed oil meal, soy bean meal, oat meal, wheat bran, corn germ meal, etc., or suitable mixtures of such or other similar vegetable materials. The amount of unslaked lime employed will vary depending upon the amount of molasses and to some extent upon the amount of fat-soluble vitamin-containing material being incorporated into the vitamin-containing end-products. In most cases, we prefer to employ about 1 part of CaO per 3 parts of molasses in the product although ratios as wide as 1 part of lime per 6 parts of molasses may be used if desired.

Any suitable material rich in any one or more of the natural and/or synthetic fat-soluble vitamins, e. g., A, D and E, may be used in producing the products of the invention, the corresponding provitamins being included under the generic expression "vitamins." It is preferred to use animal, vegetable or fish oils rich in the fat-soluble vitamins such as cod liver oil, shark liver oil, halibut liver oil, sardine oil, tuna liver oil, palm and like oils, concentrates thereof or such oils fortified with vitamin concentrates or other oils containing antirachitically activated sterols such as irradiated ergosterol, irradiated 7-dehydrocholesterol, and the like. While the process of the invention is particularly directed to the production of products containing fat-soluble vitamins and especially vitamin D and while the vegetable materials employed in producing these products ordinarily contain vitamins $B_1$ and riboflavin, these two vitamins, as well as other water-soluble vitamins, e. g., vitamin C, calcium pantothenate, niacin, biotin, pyridoxine, etc., may be incorporated into the vitamin food product if desired.

In preparing the products of our invention, the molasses, the finely divided vegetable material, and CaO are thoroughly and intimately admixed in the proportions desired. If a product is being prepared which is to be fortified with any one or more of the fat-soluble vitamins, a suitable fat-soluble vitamin-containing material is admixed with either the molasses or the vegetable material or both before the molasses and vegetable material are mixed with each other. The molasses and the vegetable material are then admixed similarly as when an unfortified product is being prepared, except that it is preferred that all mixing operations be carried out under a reduced pressure or in an inert atmosphere in order to prevent destructive oxidation of the vitamins. It is preferred to employ finely divided vegetable materials which are relatively high in natural antioxidants in preparing vitamin-fortified products so as to inhibit oxidation of the vitamins therein. Practically all of the vegetable materials mentioned hereinabove are relatively high in natural antioxidants. In case a vegetable material is employed which contains only a relatively small amount or no natural antioxidants, it may be desirable to admix therewith a small amount of a natural antioxidant-containing vegetable oil or fractions thereof containing large amounts of natural antioxidants, such as, for example, antioxidant fractions prepared by the processes of copending applications of L. O. Buxton, Serial Nos. 351,909 and 397,547, filed August 8, 1940 and June 11, 1941 respectively, which have matured into Patents Nos. 2,345,576 and 2,345,578 respectively. Antioxidant fractions produced by those processes contain the major portion of the antioxidants which were associated with the original oil or vegetable material. In some cases, if desired, the vitamin-containing material may be emulsified in the molasses and the molasses emulsion then dehydrated by means of an alkaline dehydrating agent and the dry, easily powdered product which is obtained may then be admixed with a finely divided vegetable material to produce the products of the invention.

In carrying out the dehydration of the molasses-vegetable material mass or of the molasses emulsion of the vitamin-containing material, the CaO is slowly added with thorough agitation. The reaction is exothermic due to the combination of the CaO with the moisture in the molasses. Moreover, the lime reacts with the various carbohydrates, fats and proteins present in the mass to form calcium salts or addition products thereof. Due to the exothermic reaction, no extraneous heat need be applied to dry the mass. The use of reduced pressure aids in removing some of the moisture. If desired, the vegetable material and the molasses or molasses emulsion of the fat-soluble vitamins may be admixed and the dehydrating agent then added thereto; or the molasses or molasses emulsion may be dehydrated and then mixed with the vegetable material. However, we greatly prefer to admix the vegetable meal with the dehydrating agent, and then admix the molasses, and fat-soluble vitamins if a fortified product is being prepared, therewith. In this manner, it is possible to more readily control the dehydrating reaction and thus obtain a more uniform and satisfactory product. In all cases, the product which is obtained will be a dry, powdery material or a product which may be easily reduced to a finely divided form so that it may be readily admixed with stock or poultry feeds.

The amount of vitamin-containing material which is incorporated into the product will, of course, vary with the potency which is desired in the end product and with the potency of the vitamin-containing material being employed. However, in most cases, it is preferred that the final product contain not more than about 10% of the vitamin-contained material. The relative amounts of molasses and vegetable material may vary considerably. Thus, as much as 3 parts of molasses to 1 part of vegetable material may be employed if desired. However, it is preferred that about equal parts of molasses and vegetable material be used. In some cases, particularly when an unfortified product is being prepared, a ratio of as high as 3 parts or more of vegetable material to 1 part of molasses may be used.

In all cases, a dry, highly palatable product is obtained. In the case of the vitamin-fortified products, they may readily be employed advantageously for the fortification of poultry and stock feeds. The products are valuable not only for their vitamin content, but also for their relatively high content of readily assimilable calcium. This is particularly advantageous when the products are used in poultry feeds since, as is well known, both young chickens and laying hens require large amounts of calcium. Also, as is well known, both vitamin D and calcium are necessary in order for the body to properly use and assimilate the other. The products of the invention provide these two essential materials in a readily available form.

For a fuller understanding of the nature and objects of the invention, reference should be had to the following examples which are given merely to further illustrate the invention and are not to be construed in a limiting sense, all parts given being by weight. All vitamin potencies are expressed in U. S. P. units.

*Example I*

400 parts of linseed oil meal and 150 parts of powdered CaO were thoroughly admixed and de-aerated in a mechanical mixer under a vacuum of about 27 in. The vacuum was then broken and 450 parts of a molasses-fish liver oil emulsion containing 10% of fish liver oil were slowly added to the CaO-meal mixture with stirring. The entire mass was then thoroughly admixed under vacuum until it was completely dry. A highly satisfactory product containing 3700 units of vitamin A and 700 units of vitamin D per gram was obtained. The product was slightly lumpy, but it was easily reduced to a suitable particle size.

*Example II*

A dry, fat-soluble vitamin-fortified food product was prepared similarly as in Example I, except that the molasses emulsion was added to the CaO-meal mixture by means of a dropping funnel without breaking the vacuum in the mixer. Also, the temperature of the mixer jacket was raised slightly during the latter part of the mixing operation. These variations in the mixing operations gave a somewhat more finely divided product than was obtained in Example I.

*Example III*

500 parts of the same molasses-fish liver oil emulsion as was employed in Example I, 400 parts of linseed oil meal and 100 parts of CaO were thoroughly admixed under vacuum similarly as in Example I. The dehydration proceeded somewhat more slowly than in the previous case, apparently because of the somewhat wider ratio of CaO to molasses-fish liver oil emulsion, i. e., 1 to 5 as compared to 1 to 3 in Example I. However, by continuing the mixing for a somewhat longer period of time, a completely dry, satisfactory product was obtained.

It is evident from the above discussion and examples that the process of our invention provides a product comprising a finely divided vegetable material, the individual particles of which are coated and/or impregnated with a dehydrated crude sugar syrup, calcium derivatives of carbohydrates, fats and proteins and vitamins when they are added. This product, wherein the constituents are so tightly bound together, is admirably suited for the fortification of poultry and stock feeds, particularly when vitamin D is included. The expression "bearing" is used in the appended claims to cover both an impregnated and/or a coated product.

When calcium oxide is referred to in the claims drawn to the products of the invention, it is to be understood that the term includes any of the hydrated forms of the oxide which may be present since, of course, in the dehydration process, part of the calcium oxide becomes hydrated.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. A process for producing a dry free-flowing vegetable material fortified with a fat-soluble vitamin which comprises drying crude sugar syrup, comminuted vegetable material and fat-soluble vitamin-containing material by mixing unslaked lime therewith, the quantity of unslaked lime being sufficient to substantially completely dehydrate the entire mass and amounting to at least one-sixth of the weight of crude sugar syrup.

2. A process for producing a dry free-flowing vegetable material fortified with a fat-soluble vitamin which comprises drying molasses, comminuted vegetable meal and fat-soluble vitamin-containing material by mixing calcium oxide therewith, the quantity of calcium oxide being sufficient to substantially completely dehydrate the entire mass and amounting to at least one-sixth of the weight of molasses.

3. A process for producing a dry free-flowing vegetable material fortified with a fat-soluble vitamin which comprises emulsifying a fat-soluble vitamin-containing material in molasses, mixing a comminuted vegetable material and calcium oxide, and drying the entire mass by mixing the molasses emulsion with the vegetable-calcium oxide mixture, the quantity of calcium oxide being sufficient to substantially completely dehydrate the entire mass and amounting to at least one-sixth of the weight of molasses.

4. A process for producing a dry free-flowing vegetable material fortified with a fat-soluble vitamin which comprises mixing a comminuted vegetable material with an emulsion of fat-soluble vitamin-containing material in molasses, and drying the resulting mixture by mixing therewith a quantity of calcium oxide sufficient to substantially completely dehydrate the entire mass and amounting to at least one-sixth of the weight of molasses.

ANDRÉ E. BRIOD.
LORAN O. BUXTON.

REFERENCES CITED

The following references are of record in the file of this patent:

UNITED STATES PATENTS

| Number | Name | Date |
| --- | --- | --- |
| 2,018,797 | Lewis | Oct. 29, 1935 |
| 2,105,745 | Lewis | Jan. 18, 1938 |
| 2,321,400 | Lubarsky | June 8, 1943 |
| 2,227,246 | Chuck | Dec. 31, 1940 |
| 1,996,395 | Arnold | Apr. 2, 1935 |